US 8,447,716 B2

(12) United States Patent
Bagley et al.

(10) Patent No.: US 8,447,716 B2
(45) Date of Patent: May 21, 2013

(54) DYNAMIC CONSTRAINT SATISFACTION PROBLEM SOLVER WITH INFERRED PROBLEM ASSOCIATION REMOVAL

(75) Inventors: Claire M. Bagley, Carlisle, MA (US); Gao Chen, Beijing (CN); Joyce Ng, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 736 days.

(21) Appl. No.: 12/509,546

(22) Filed: Jul. 27, 2009

(65) Prior Publication Data

US 2011/0022557 A1 Jan. 27, 2011

(51) Int. Cl.
*G06N 5/02* (2006.01)

(52) U.S. Cl.
USPC .................................................. 706/46

(58) Field of Classification Search
USPC .................................................. 706/46
See application file for complete search history.

(56) References Cited

U.S. PATENT DOCUMENTS

| 7,069,537 | B2 | 6/2006 | Lazarov |
| 7,333,968 | B2 | 2/2008 | Geller et al. |
| 7,409,377 | B2 | 8/2008 | Emek et al. |
| 2002/0107749 | A1 | 8/2002 | Leslie et al. |
| 2002/0143653 | A1 | 10/2002 | DiLena et al. |
| 2002/0166089 | A1 | 11/2002 | Noy |
| 2004/0019852 | A1 | 1/2004 | Purvis |
| 2005/0198621 | A1 | 9/2005 | Tillmann et al. |
| 2005/0278271 | A1 | 12/2005 | Anthony et al. |
| 2007/0094184 | A1 | 4/2007 | Emek et al. |
| 2008/0288482 | A1 | 11/2008 | Chaudhuri et al. |

OTHER PUBLICATIONS

Fruhwirth, Thom et al; "Principles of Constraint Systems and Constraint Solvers", Archives of Control Sciences: Special Issue on Constraint Programming; 16(2); http://www.informatik.uniulm.de/pm/mitarbeiter/fruehwirth/Papers/acssystems3.pdf; 2006, pp. 1-29.
Lhomme, Olivier; "Consistency Techniques for Numeric CSPS"; Proceedings in IJCAI-93; pp. 232-238; 1993; Chambery, France.
Selectica; "Selectica Configuration"; Solution Overview; 2005; Selectica, Inc.; San Jose, CA, 2 pages.
ILOG; "ILOG Configurator, Powering online product and service configuration applications"; Product Datasheet; Mar. 2005; ILOG.S. A., 2 pages.
Oracle; "Oracle Configurator"; Oracle Data Sheet; 2008; Oracle, 4 pages.
Tacton; "Tacton's Sales Configurator—Bridging the gap between engineering and sales for selling customized products"; http://www.tacton.com/tem plates/page_68.aspx?epslanguage=EN; 2007; Tacton Systems AB; Sweden, 2 pages.
Benhamou, Frederick et al.; "Applying Interval Arithmetic to Real, Integer and Boolean Constraints"; Journal of Logic Programming. 32(1); 1997, pp. 1-28.
Sabin, Daniel et al.; "Configuration as Composite Constraint Satisfaction"; Proceedings of the (1st) Artificial Intelligence and Manufacturing Research Planning Workshop; 1996, 9 pages.

(Continued)

*Primary Examiner* — Kakali Chaki
*Assistant Examiner* — Mai T Tran
(74) *Attorney, Agent, or Firm* — Miles & Stockbridge P.C.

(57) ABSTRACT

A constraint solver for solving a constraint satisfaction problem network that comprises a plurality of nodes and a plurality of constraints. The solver receives a request to remove an inferred problem association and determines one or more user decisions that triggered the inferred problem association.

19 Claims, 7 Drawing Sheets

OTHER PUBLICATIONS

Fleischanderl, Gerhard et al.; "Configuring Large Systems Using Generative Constraint Satisfaction"; IEEE; pp. 59-68; No. 1094-7167/98; Jul./Aug. 2008.

Mittal, Sanjay et al.; "Dynamic Constraint Satisfaction Problems"; Proceedings of the Eighth National Conference on Artificial Intelligence; 1996, pp. 25-32.

Stumptner, Markus et al.; "Generative Constraint-Based Configuration of Large Technical Systems"; Artificial Intelligence for Engineering Design, analysis and Manufacturing; pp. 307-320; No. 12; 1998; Cambridge University Press, USA.

Gelle, Esther et al.; "Solving Methods for Conditional Constraint Satisfaction"; IJCAL; 2003, 2 pages.

Junker, Ulrich;"QuickXplain: Conflict Detection for Arbitrary Constraint Propagation Algorithms"; ILOG; Valbonne, France; 2001.

N. Jussien and O. Lhomme, Dynamic Domain Splitting for Numeric CSPs, ECAI 98. 13th European Conference on Artificial Intelligence, 1998, pp. 224-228.

U. Junker and D. Mailharro, Preference Programming: Advanced Problem Solving for Configuration, Artificial Intelligence for Engineering Design, Analysis and Manufacturing (2003), 17, pp. 13-29.

DYNAMIC CONSTRAINT SATISFACTION PROBLEM SOLVER WITH INFERRED PROBLEM ASSOCIATION REMOVAL

FIELD OF THE INVENTION

One embodiment is directed generally to a computer system, and in particular to a constraint based computer system that solves dynamic constraint satisfaction problems.

BACKGROUND INFORMATION

Many of the tasks that are addressed by decision-making systems and artificial intelligence systems can be represented as constraint satisfaction problems ("CSP"s). In this representation, the task is specified in terms of a set of variables, each of which can assume values in a given domain, and a set of constraints that the variables must simultaneously satisfy. The set of variables, domains and constraints is referred to as a CSP. Each constraint may be expressed as a relation, defined over some subset of the variables, denoting valid combinations of their values. A solution to a CSP is an assignment of a value to all the variables from their respective domains that satisfies all of the constraints.

A constraint based system includes a constraint solver that attempts to find one or more solutions to a given CSP, or prove that no solution exists. Constraint based systems are used for many artificial intelligence related applications and a variety of other applications, including: (1) Product configurators; (2) Robotic control; (3) Temporal reasoning; (4) Natural language processing; (5) Spatial reasoning; (6) Test-case generation for software and hardware systems; (7) Machine vision; (8) Medical diagnosis; (9) Resource allocation; and (10) Frequency allocation.

The network of constraints in a CSP can be viewed as a graph, having a node for each variable and an "arc" for each constraint. The members of each arc are the variables that appear in the constraint to which the arc corresponds. An arc is said to be consistent if for any variable of the arc, and any value in the domain of the variable, there is a valid assignment of values to the other variables on the arc that satisfies the constraint represented by the arc.

Classes of problems exist which are comprised of very large sets of variables that may only be conditionally related or required for a solution. One example of such problems is the configuration of large component-based systems. For example, selecting a type of hard disk controller for a computer configuration is not needed if a hard disk has not been chosen as a form of storage. If instead flash memory is chosen, a different set of variables and constraints would be required to be solved. Known CSP solvers do not allow the representation of conditional structure or reasoning over an inclusion of a variable in a solution. Techniques have been developed to allow such large problems to be represented as a set of smaller sub-problems, conditionally related through composition or association. A "dynamic constraint satisfaction problem" is one in which these sub-problems of variables and constraints can be incrementally added as required, either explicitly or as a result of inference from the propagation of constraints.

One known approach to minimize large CSP problems is referred to as "Conditional CSP", and includes the notion of a variable being active or inactive, as well as constraints to activate a variable. In this approach, a variable is only assigned a value in the final solution if it is active. Conditional CSP is limited in that it does not provide any significant space savings in large problems, nor does it allow for segmentation of related variables into sub-problems. Another known approach is referred to as "Generative CSP" and extends Conditional CSP by introducing the concept of components, which are groups of related variables, and component type, which is the further extension and specialization of these components. However, similar to Conditional CSP, Generative CSP is still implemented in terms of activity state and does not provide real space savings.

SUMMARY OF THE INVENTION

One embodiment is a constraint solver for solving a constraint satisfaction problem network that comprises a plurality of nodes and a plurality of constraints. The solver receives a request to remove an inferred problem association and determines one or more user decisions that triggered the inferred problem association.

DETAILED DESCRIPTION

One embodiment is a dynamic constraint satisfaction problem solver that determines a user decision that triggered an inferred problem association. The user decision can then be removed so the inferred association is also removed and does not return.

Figure 1:
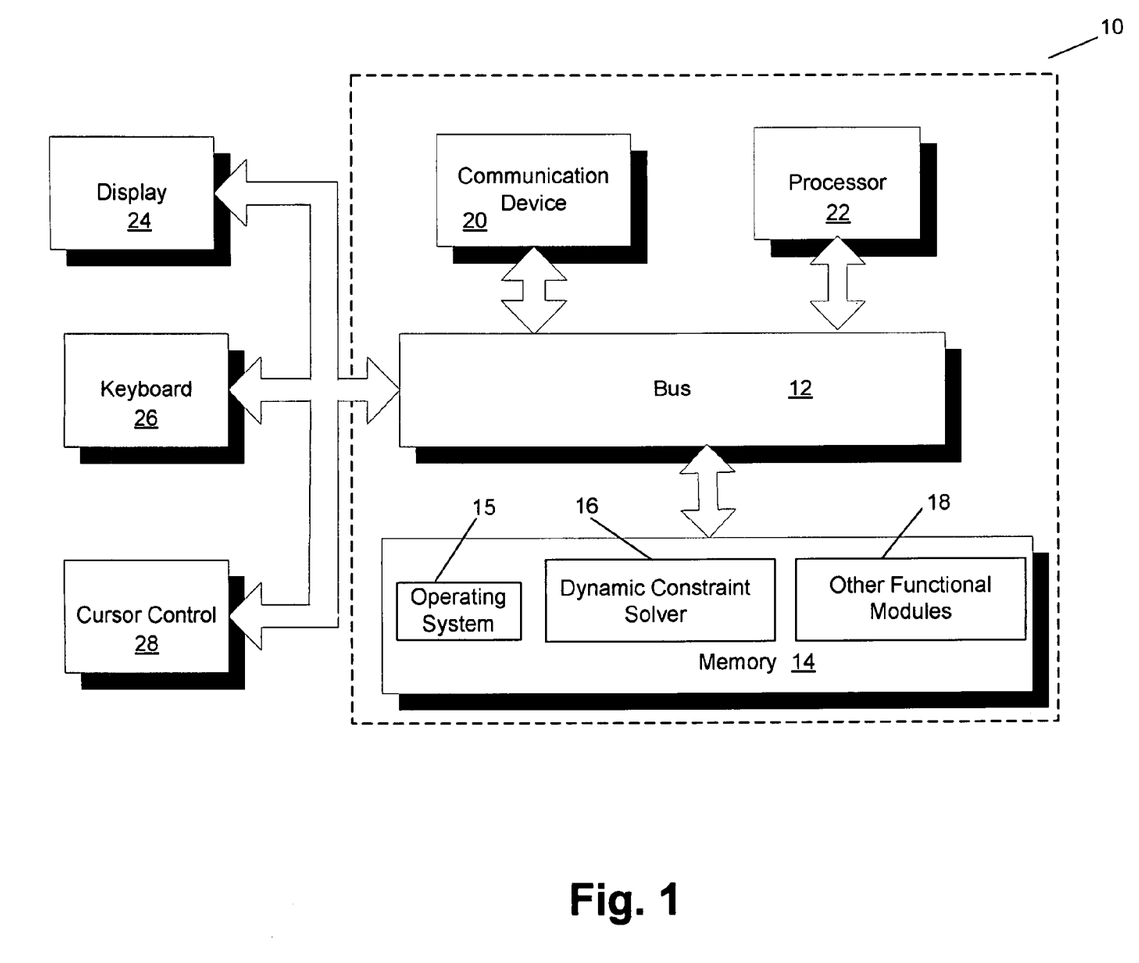
FIG. 1 is a block diagram of a dynamic constraint based system that can implement an embodiment of the present invention.

FIG. 1 is a block diagram of a dynamic constraint based system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a dynamic constraint solver module 16 that performs dynamic constraint solving and removes inferred problem associations as disclosed in more detail below. System 10 can be part of a larger system that includes a constraint solver, such as a product configurator or artificial intelligence system. Therefore, system 10 will typically include one or more additional functional modules 18 to include the additional functionality.

Figure 2:
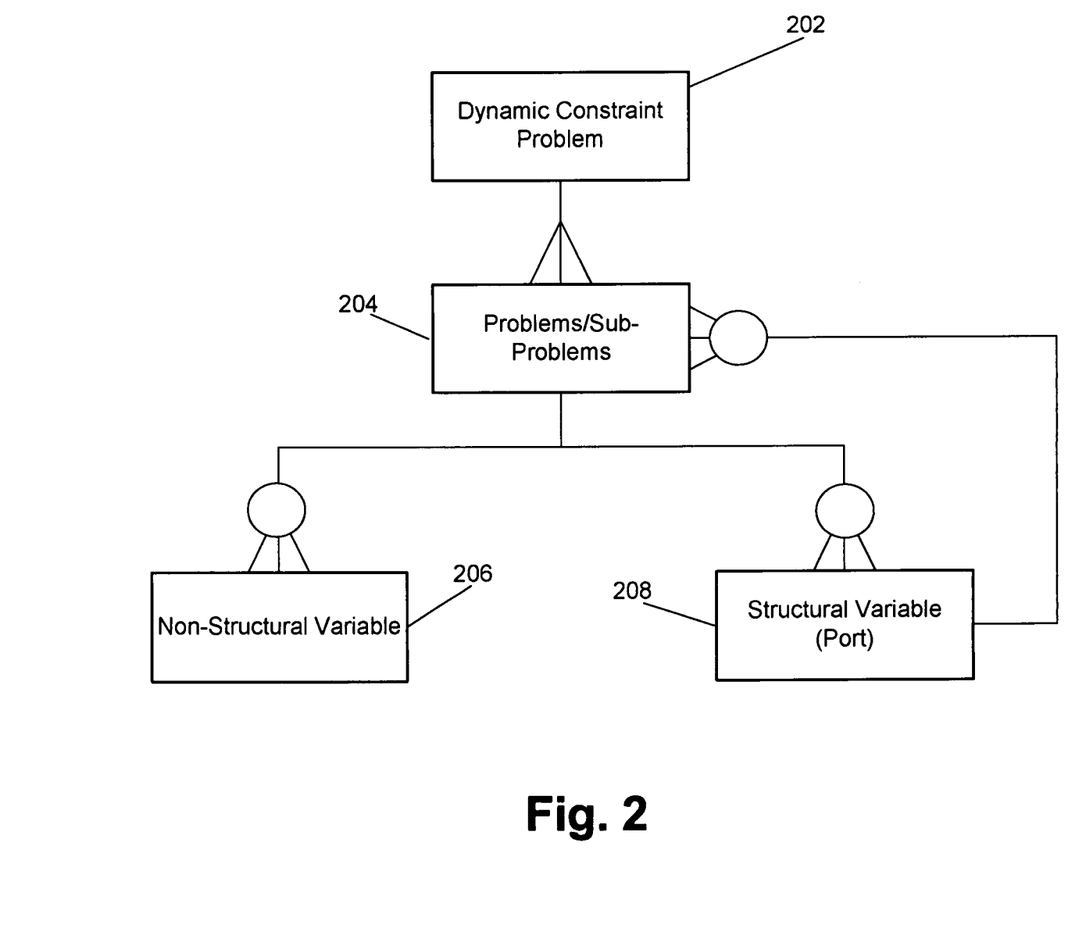
FIG. 2 illustrates the hierarchy of a model of a dynamic constraint problem in accordance with one embodiment.

FIG. 2 illustrates the hierarchy of a model of a dynamic constraint problem 202 in accordance with one embodiment. Dynamic constraint problem 202 includes one or more problems or sub-problems 204 (a "sub-problem" may also be a "problem", and vice versa depending on where it falls in the hierarchy). In an embodiment where the dynamic constraint problem is for a product configurator, the problems/sub-problems are the components/sub-components of the configurator.

Each problem is formed of zero or more non-structural variables 206. Examples of non-structural variables 206 include Boolean variables, integer variables, floating point variables, etc. Each problem 204 may also include zero or more structural variables or "ports" 208. A port is a container for problems and connects sub-problems to the problem or to another sub-problem or acts as an extension point from one problem to another problem. Each port 208 can be connected to zero or more sub-problems 204. A port may be defined by two items: (a) the definition of the problem to be connected to the port; and (b) a numeric domain representing how many instances of the problem is required or allowed in the port (referred to as the port's "cardinality").

For example, a problem definition for Problem A may be as shown in Example 1 below (the bracketed information indicates the cardinality domain, or the domain of the number of instances allowed/required for the problem/port):

Problem A
|_Port to Problem B [1 . . . 5]
  |_Problem B1

Example 1

As shown in the definition, Problem A includes a port to Problem B. According to that port, Problem A may include zero to five Problem Bs. In Example 1, one Problem B (B1) is coupled to the port to Problem B. The cardinality domain for the port to Problem B is thus [1 . . . 5].

Certain conditions in the problem state can lead to the addition of "inferred" problems or sub-problems, also referred to as "arbitrary" problem associations or auto-contained ("AC") decisions. In general, inferred problems may be generated with an existing Problem A if the following condition is met: Problem A requires a certain number of Problem Bs to be associated with it and there are not enough existing available Problem Bs that can be associated with Problem A. The following are three examples that illustrate the generation of an inferred problem:

(1) The user performs an action (a "user decision" or "UD"). After propagation of the consequences, an existing Problem A now requires one Problem B to be associated with it. There is no instance of Problem B. Therefore, a new Problem B is generated and associated with Problem A through inference. Problem B is an inferred problem association or an "AC decision".

(2) The user performs an action. After propagation of the consequences, an existing Problem A now requires one Problem B to be associated with it. There is already an instance of Problem B. No inferred problem is generated because the solver cannot decide whether to associate this existing Problem B with Problem A, or to have a new Problem B associated with Problem A.

(3) An existing Problem A requires one Problem B to be associated with it. There is already an instance of Problem B, but this Problem B is not associated with Problem A yet (as in the previous example). Now the user performs an action. After propagation of the consequences, the solver determines that for some reason the existing Problem B is not allowed to be associated with Problem A. A new Problem B is then generated and associated with Problem A through inference.

Sometimes it is desirable to "unfold" a CSP in order to explain the problem state to the user. Explanation of a problem state is disclosed, for example, in Ulrich Junker (2001), "QuickXPlain: Conflict Detection for Arbitrary Constraint Propagation Algorithms", *IJCAI'01 Workshop on Modeling and Solving Problems with Constraints*. An explanation of a problem state is generally presented in terms of an end user's decisions. However, because AC decisions are the result of propagation, explaining in terms of system generated/inferred actions is generally meaningless to the end user.

If a user wishes to remove the effects of an AC decision, simply removing the AC decision will not suffice because the user decisions that triggered the AC decision will still exist and the same AC decision will be inferred again. Therefore, a CSP should also be unfolded in an interactive CSP solver to help a user identify which previous user decisions need to be removed in order to remove the effect of an AC decision.

Figure 3:
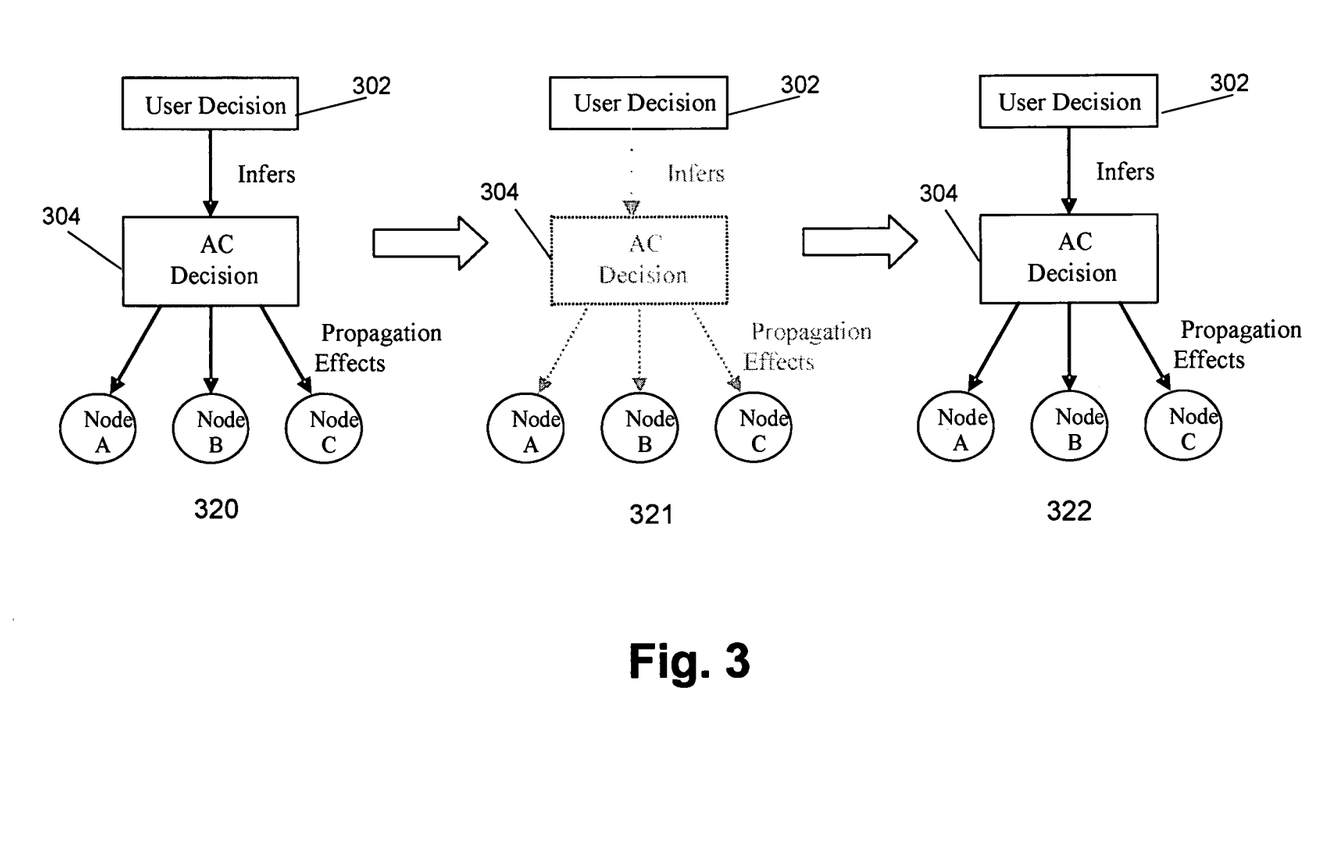
FIG. 3 is a block diagram illustrating the removal of an inferred auto-contained decision.

FIG. 3 is a block diagram illustrating the removal of an inferred AC decision. Initially, at stage 320, a user decision 302 infers an AC decision 304, which is propagated among the nodes of the CSP network. At stage 321, AC decision 304 is removed. However, at stage 322, because user decision 302 still is in place, AC decision 304 is again inferred and regenerated.

As illustrated by FIG. 3, simply removing an inferred AC decision only removes the propagation effects temporarily. From the triggering user decision, the exact same problem association will be inferred again, and the user will see its propagation effects again. Therefore, in order to properly reason over and manage removals in a CSP model with AC decisions, solver 16 in one embodiment determines the triggering user decisions that led to the inference of the AC decisions.

Figure 4:
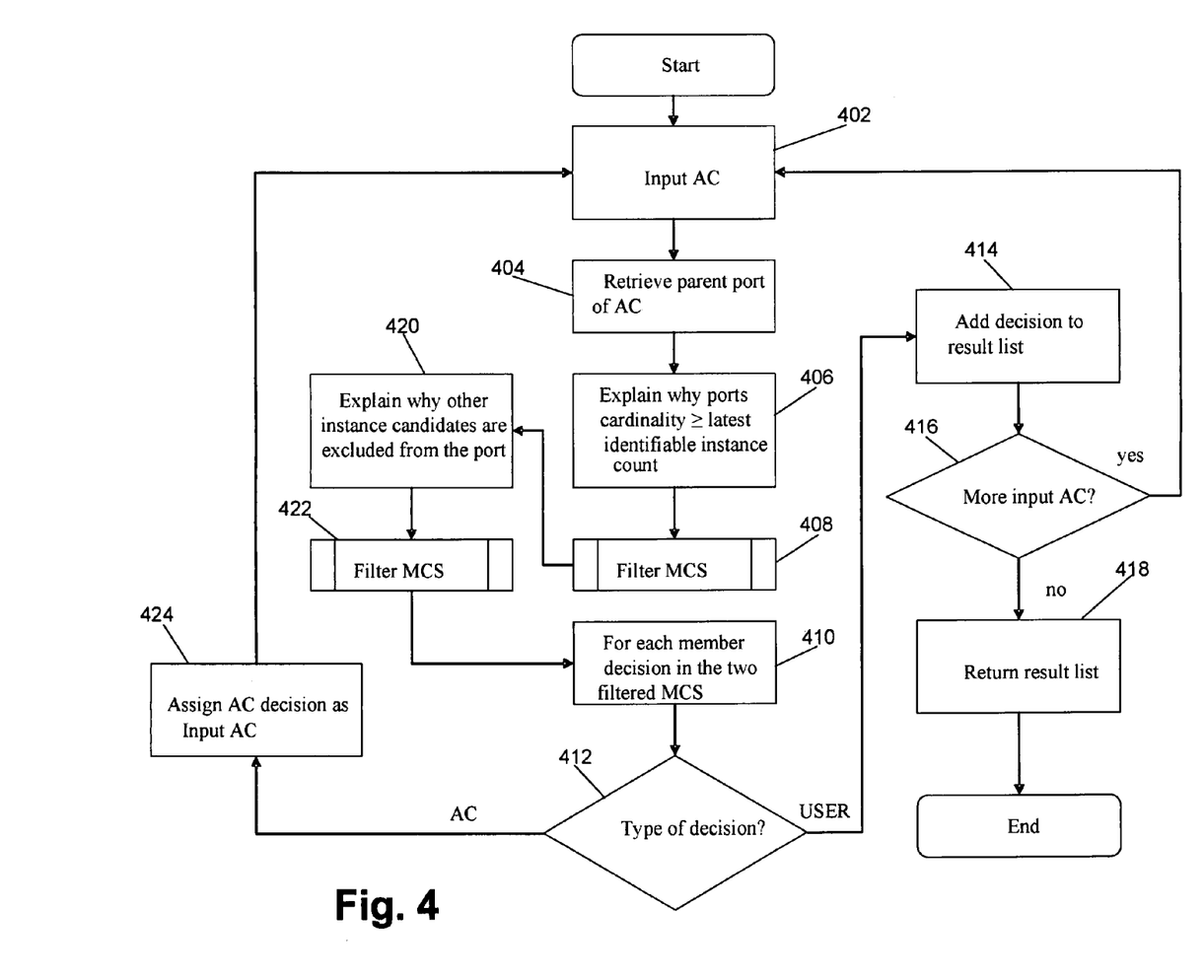
FIG. 4 is a flow diagram of the functionality of the dynamic constraint solver module when determining the user decision(s) that triggered an input auto-contained decision in accordance with one embodiment.

FIG. 4 is a flow diagram of the functionality of dynamic constraint solver module 16 when determining the user decision(s) that triggered an input AC decision in accordance with one embodiment. In one embodiment, the functionality of the flow diagram of FIG. 4, and FIGS. 5 and 6 disclosed below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In one embodiment, the functionality of FIG. 4 is executed when an unfolding process for a particular AC decision is initiated. For example, FIG. 4 may be executed when a user attempts to remove the effect of an AC decision. In this example, solver 16 will run the functionality of FIG. 4 to find the triggering user decision or decisions, and will either remove them on behalf of the user, or will present the triggering user decisions and interact with the user, thus providing the user with the option to remove the triggering user decisions. In another example, FIG. 4 may be executed when a user requests an explanation for a given problem state, and the explanation includes AC decisions. In this example, solver 16 will unfold them and present the more meaningful triggering user decisions in addition to the AC decisions.

At 402, the input AC decision is received.

At 404, the parent port of the input AC decision is retrieved.

At 406, an explanation engine is invoked to determine why the port's cardinality is greater than or equal a current count of identifiable instances or to explain the current state of the port in terms of existing AC decisions and user decisions. In one embodiment, at 406 a Minimum Conflict Set ("MCS") is determined. A MCS is a minimal set of previously made user decisions and/or AC decisions together with a conflict triggering attempted user decision that are responsible for the conflict, or a subset of the given user decisions that are sufficient to deduce the conflict, but for which no proper subset of them allows one to do so. In one embodiment, the MCS can be determined using the known QuickXplain algorithm. In other embodiments, the MCS can be determined using other methods. In one embodiment, the set may not be the minimum set of decisions, but could be any set of decisions that caused and/or explains the conflict.

Figure 5:
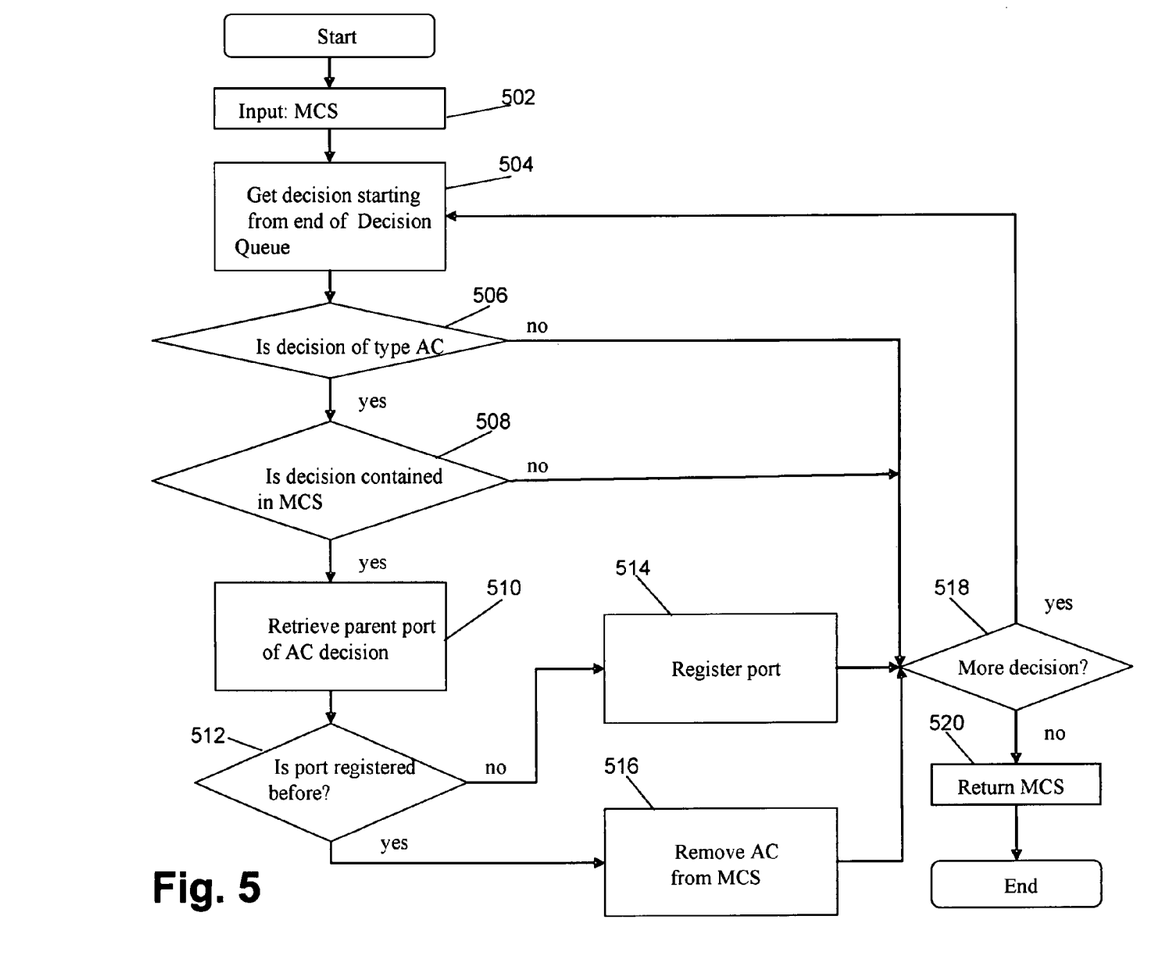
FIG. 5 is a flow diagram of the functionality of the dynamic constraint solver module when filtering out auto-contained decisions in accordance with one embodiment.

At 408, the decision set at 406 is filtered so that all AC decisions in the set from the same port are removed except for the chronologically latest occurring AC decision. In one embodiment, the latest occurring AC decision for each port can be identified by checking the order it appears in the decision queue since the requests in the queue are in chronological order. FIG. 5 is a flow diagram of the functionality in accordance to one embodiment for filtering the MCS.

At 420, an explanation engine is again invoked to explain why other instance candidates from 408 is excluded from the port. Therefore, another MCS is generated.

At 422, the decision set at 420 is filtered so that all AC decisions in the set from the same port are removed except for the chronologically latest occurring AC decision (using the functionality of FIG. 5).

At 410, for each member decision in each of the filtered sets (i.e., the filtered sets from 408 and 422), a determination is made regarding the type of decision: user decision or AC decision. If an AC decision, at 424 the AC decision is assigned as the input AC decision and the functionality continues at 402.

If the decision is a user decision at 412, at 414 the user decision is added to the result list. At 416, if there is more input AC decisions, the functionality continues at 402. If there are no more input AC decisions, the results list is returned at 418. The results list is the complete list of user decisions that triggered the input AC decision that caused a conflict.

As an example of the functionality of FIG. 4, suppose the input AC decision is AC4. After the explanation engine is invoked at 406 for AC4's port cardinality, assume the result is a MCS1 with {AC1, AC2, UD5} where AC1 and AC2 share the same parent port.

After filtering MCS at 408, the conflict set becomes {AC2, UD5} (assuming AC2 comes after AC1 in the decision queue).

After the explanation engine is invoked at 420 on the auto-contained instance of AC4 being excluded from the port, assume the resulting MCS2 includes {AC6, UD10}. At 410, the following decisions need to be further unfolded from the two combined MCSs (i.e., MCS1 and MCS2): {AC2, UD5, AC6, UD10}.

UD5 and UD10 will be stored in the result list at 414 since they need no further processing. AC2 and AC6 become the input ACs at 424 and the unfolding process continues.

For the unfolding of AC2, at 406 the explanation engine is invoked to explain why the parent port of the auto-contained instance in AC2 is greater than or equal to the latest identifiable instance count recorded in AC2. Assume the resulting MCS3 includes {UD9} only. No filtering on MCS3 is required at 408 since none of its member decisions is an AC decision. At 420, it is explained why some other instances besides AC2 are excluded from the port of the auto-containment, which does not apply in this example. Hence, the resulting MCS4 is empty at 420.

The following decisions are left to work with at 412 after combining MCS3 and MCS4: {UD9}. Since UD9 is of type user decision, it is added to the result list at 414, which now includes UD5, UD10, and UD9.

For the unfolding of AC6, at 406, to explain why the parent port's cardinality of the auto-contained instance in AC6 is less than the latest identifiable instance count recorded in AC6, assume the resulting MCS5 includes {UD11} only.

At 408, no filtering on MCS5 is required since none of its members is an AC decision. At 420, to explain why some other instances associated with AC6 are excluded from the port of the auto-containment, assume the result MCS6 contains {UD15} only.

At 412, decisions {UD11, UD15} are available after combining MCS5 and MCS6. Both are added to the result set at 414 since they are user decisions. The result set should now contain {UD5, UD10, UD9, UD11, UD15}. Since there is no more input AC decisions at 416, solver 16 has now found all the triggering user decisions for AC4: {UD5, UD10, UD9, UD11, UD15}.

FIG. 5 is a flow diagram of the functionality of dynamic constraint solver module 16 when filtering out AC decisions in an MCS or other conflict set in accordance with one embodiment. The functionality of FIG. 5 is used to filter out the "old" AC decisions for each port so only the most chronologically recent one can be examined.

At 502, the MCS is received. The MCS includes AC decisions and/or user decisions.

At 504, the next decision starting at the end of the decision queue is retrieved. The decision queue is a chronological order of decisions, with the "end" being the most recent decision.

At 506, it is determined if the decision is an AC decision. If no, functionality continues to 518. If yes at 506, at 508 it is determined if the decision is contained in the MCS. If no, functionality continues to 518.

If yes at 508, at 510 the parent port of the AC decision is retrieved. At 512, it is determined if the port has been registered as one of the MCS corresponding ports. If no, at 514 the port is registered.

If the port was registered at 510, at 516 the AC decision is removed from the MCS, because it is not the chronologically latest AC decision for that port. Functionality then continues to 518.

At 518, it is determined if there are more decisions in the decision queue. If yes, functionality resumes at 504 where the next decision in the queue is retrieved. If no at 518, the modified MCS is returned. The modified MCS is filtered in that it includes only the chronologically latest AC decision for each port.

As an example of the functionality of FIG. 5, suppose the input MCS at 502 includes decisions {AC2, AC3, AC4, UD0, UD5} where AC2 and AC4 share the same parent port Port1. Assume that the decision queue contains the following decisions in chronological order: {UD0, AC1, AC2, AC3, AC4, UD5, UD6}.

The functionality of FIG. 5 examines the decision queue from the bottom up. Specifically, it first examines UD6 at 504. Since UD6 is not an AC decision at 506, at 518 the next decision in the queue is examined (i.e., UD5). UD5 is not an AC decision. The next decision AC4 is an AC decision and a member of the input MCS at 508. At 514, AC4's parent port Port1 is registered since it had not been registered yet at 512.

The next decision AC3 is an AC decision and a member of the input MCS. AC3's parent port Port2 is registered since it had not yet been registered.

The next decision AC2 is an AC decision and a member of the input MCS. AC2's port Port1 has already been registered, so AC2 is removed from the MCS at 516.

The next decision AC1 is an AC decision but not a member of the MCS. The next decision UD0 is not an AC decision. The functionality is now done and the filtered MCS {AC3, AC4, UD0, UD5} is returned at 520.

Figure 6:
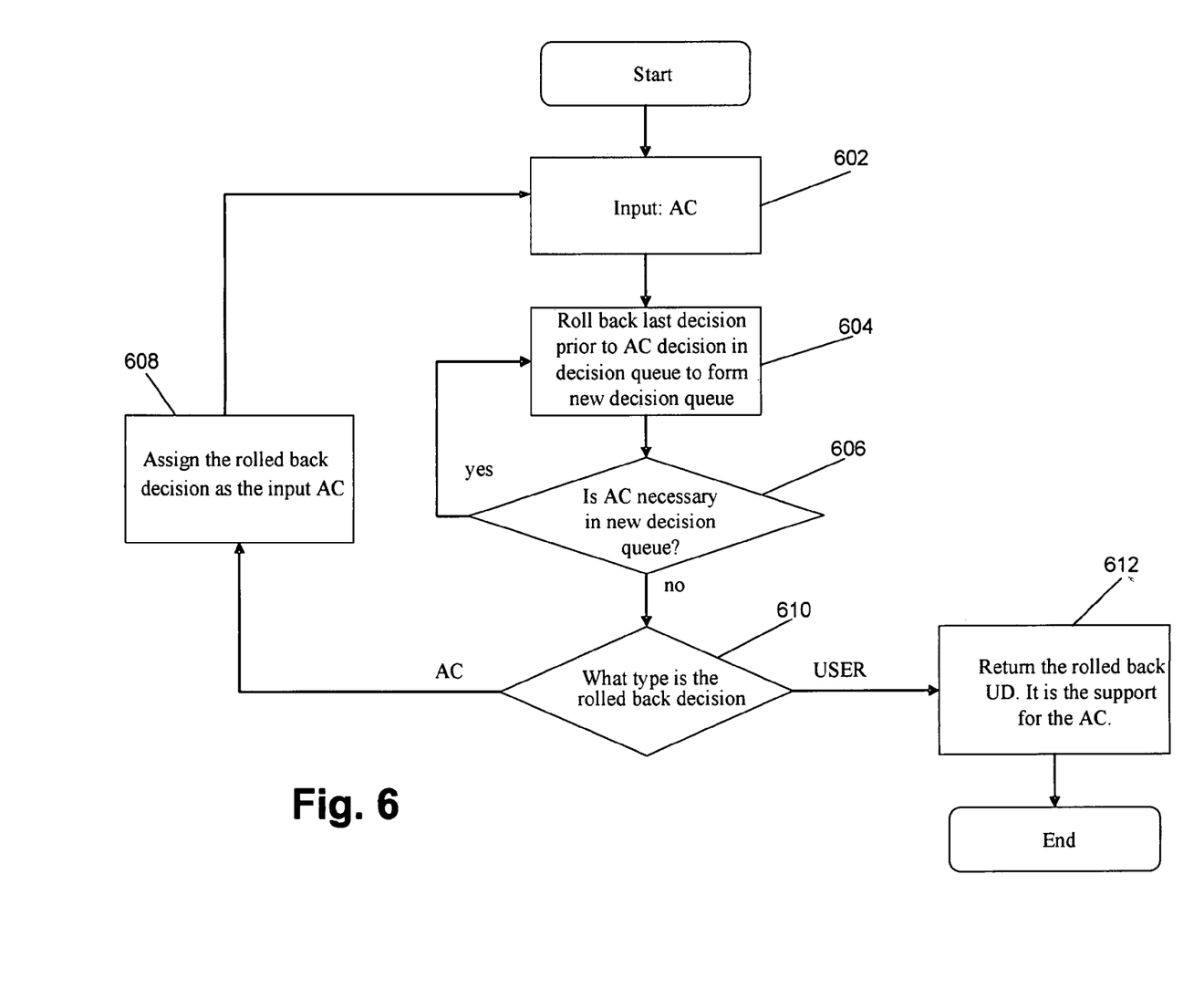
FIG. 6 a flow diagram of the functionality of the dynamic constraint solver module when performing a batch reapply and encountering an auto-contained decision that cannot be reapplied due to a conflict in the CSP network in accordance with one embodiment.

FIG. 6 a flow diagram of the functionality of dynamic constraint solver module 16 when performing a batch reapply and encountering an AC decision that cannot be reapplied due to a conflict in the CSP network in accordance with one embodiment. Solver 16 may do a batch reapply, for example, when a user attempts to remove/revise a previously asserted user decision and solver 16 backs up to the point where the original user decision was asserted and then reapplies all applicable decisions. The result of the functionality of FIG. 6, similar to the functionality of FIG. 4, is the identity of a triggering user decision for a given AC decision. The functionality of FIG. 6 will identify the latest most recent triggering user decision, while the functionality of FIG. 4 will identify all triggering user decisions.

At 602, the AC decision is received.

At 604, solver 16 rolls back to the last decision prior to the input AC decision in the decision queue. The "new" decision queue then ends before this last decision.

At 606, it is determined if the AC decision is "necessary" such that the port still needs to contain the new generic instance in order to satisfy its cardinality, without the loss of generality. If necessary, the functionality continues to 604 where the next prior decision in the decision queue is rolled back to.

If no at 606, at 610 it is determined what type of decision is the rolled back decision. If a user decision, at 612, the rolled back user decision is returned because it is the support for the AC decision.

If an AC decision at 610, then the rolled back decision is assigned as the input AC at 608 and the functionality continues at 602.

To illustrate the functionality of FIG. 6, assume the decision queue includes the following decisions in order: {UD1, UD2, AC3, UD4, AC5, UD6, AC7 ...}. The objective of the functionality of FIG. 6 is to identify the triggering user decision for a given AC decision.

As a first example, assume the input AC decision is AC3 at 602. At 604, solver 16 rolls back over the last decision in the decision queue prior to AC3 (i.e., UD2). In other words, the "new" decision queue becomes {UD1}. At 606, it is determined if AC3 is now necessary. Assume it is not. Since the last rolled back decision UD2 is of type user decision, UD2 is the triggering user decision of AC3. UD2 is returned at 612 and the process is complete.

As a second example, assume the input AC decision is AC5. The result of rolling back to the last decision prior to AC5 is UD4. The "new" decision queue is {UD1, UD2, AC3}.

Assume AC5 is necessary at this point. Therefore, at 604 solver 16 continues rolling back the last decision in the decision queue to AC3. The "new" decision queue becomes {UD1, UD2}. It is again determined if AC5 is necessary at this point. If not, then the last rolled back decision AC3 is the triggering decision. Since AC3 is of type AC decision, it needs to be further unfolded at 608.

At 602, the input AC decision is now AC3. After rolling back to the last decision UD2 in the decision queue, the "new" decision queue contains {UD1} only. Assume AC3 is not necessary at this point. The triggering decision for AC3 and AC6 is the last rolled back decision UD2. UD2 is returned as the result at 612.

To illustrate the usage of finding the triggering user decisions that lead to an AC decision or inferred problem association, and an explanation-based conflict resolution flow, consider the following CSP example with variables and constraints for the CSP network defined in Tables 1 and 2 below:

TABLE 1

Variables and their domain in the CSP

| Variable Name | Type | Defined Domain | Reduced domain after assertion of X = True |
|---|---|---|---|
| X | Boolean | {false, true} | {true} |
| Y | Boolean | {false, true} | {false, true} |
| Problem A | Port | {0 ... 3 instances of Problem B} | {associated with one Problem B} |

TABLE 2

Constraints defined in the CSP
Constraint Defined

X requires (Problem A must associate with one Problem B)
Y requires (Problem A must not have any association with Problem B)

At runtime, the user asserts the following user decisions in sequence:

1$^{st}$ user decision: X=true

This user decision is asserted successfully. The propagation of the user decision defined on X will cause solver 16 to generate a new Problem B and associate it with Problem A by adding an AC decision.

The user then attempts to add another user decision:

2$^{nd}$ user decision: Y=true

When this 2nd user decision is attempted, solver 16 will detect a conflict. The generated conflict set will contain the system generated runtime constraint Problem A associates with Problem B, which is the AC decision. Because this AC decision is an internally generated result of another user decision, it has no meaning to the user. Further, removing the AC decision without removing the user decision/constraint which caused its inference will only result in the creation of another AC decision. In order to provide the user the ability to resolve the conflict in a meaningful way, solver 16 identifies which user decision caused the inference of the AC decision.

Figure 7:
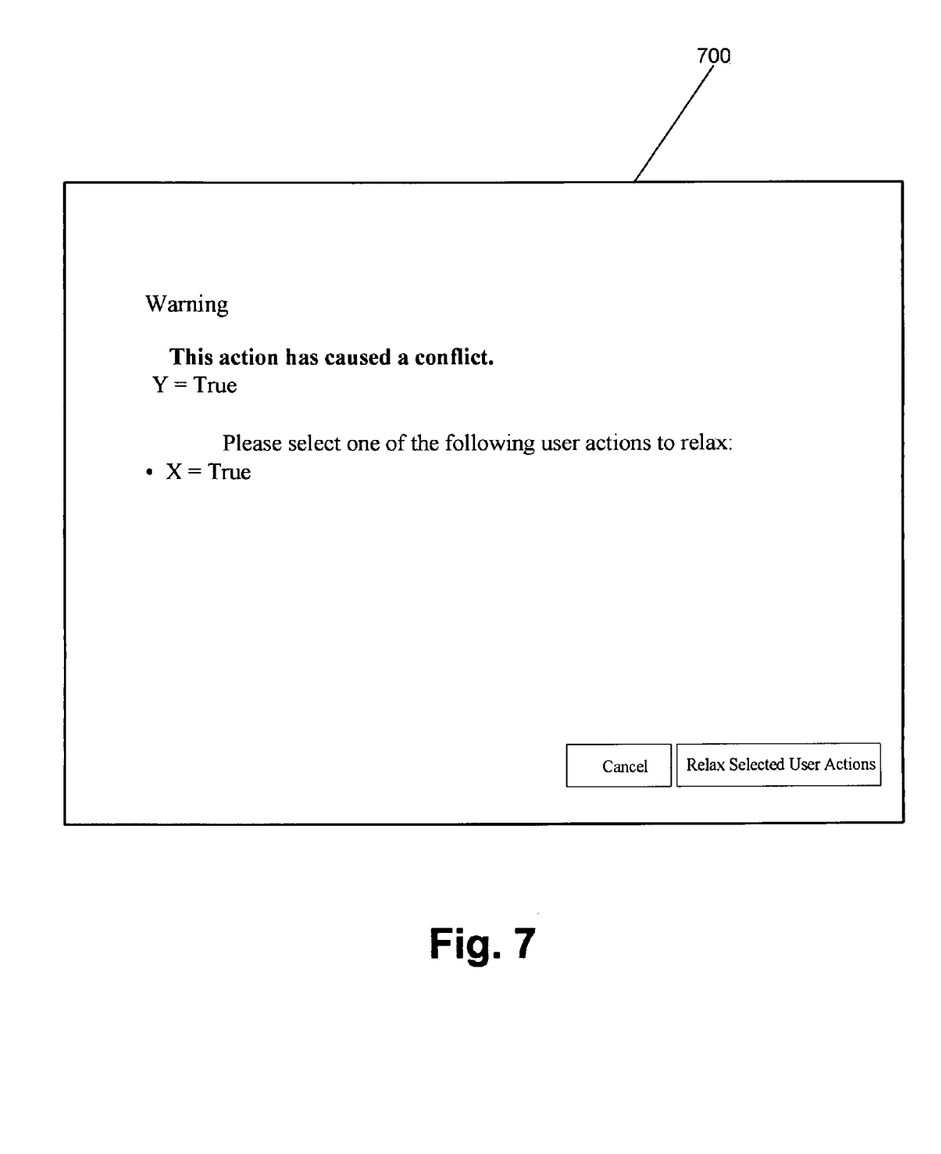
FIG. 7 illustrates an example user interface for presenting the user action to the user in accordance with one embodiment.

During the explanation-based conflict resolution flow, solver 16 will then find the triggering user decision of the AC decision with the functionality of FIGS. 4, 5, and or 6 and present the responsible user decision "X=true" to the user. FIG. 7 illustrates an example user interface 700 for presenting the user decision to the user in accordance with one embodiment.

In response to receiving/viewing user interface 700, the user may now opt to cancel the last user decision (i.e., Y=true) that triggered the conflict, or relax the previously asserted user decision (i.e., X=true) which is the AC decision triggering user decision, to resolve the conflict.

As disclosed, embodiments determine a user decision or decisions that trigger an inferred problem association or AC decision. To permanently remove the inferred associations (i.e., so the associations are not re-generated), the user decisions can be cancelled, changed or relaxed by the user, or behind the scenes by the solver without user input.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to function as a dynamic constraint solver for solving a constraint satisfaction problem that comprises a plurality of nodes and a plurality of constraints, the solving comprising:
   receiving a request to remove an inferred problem association;
   determining one or more user decisions that triggered the inferred problem association, wherein each of the one or more user decisions is an action performed by a user during an interactive session with the dynamic constraint solver; and
   removing the one or more user decisions during the interactive session;
   wherein the inferred problem association associates a first problem with a second problem;
   wherein the request to remove is in response to a conflict; and
   wherein the removal of the one or more user decisions prevents the inferred problem association from being regenerated during the interactive session.

2. The non-transitory computer readable medium of claim 1, the determining comprises:
   unfolding the inferred problem association.

3. The non-transitory computer readable medium of claim 1, the solving further comprising:
   generating a user interface that identifies the one or more user decisions to a user.

4. The non-transitory computer readable medium of claim 3, wherein the user interface provides an option to the user to remove the one or more user decisions.

5. The non-transitory computer readable medium of claim 1, wherein the one or more user decisions comprise a constraint that generates the inferred problem association when propagated.

6. The non-transitory computer readable medium of claim 1, wherein the constraint satisfaction problem is a product configuration and the first problem and the second problem are product configuration components.

7. The non-transitory computer readable medium of claim 1, the instructions further comprising:
   removing the inferred problem association and the one or more user decisions.

8. The non-transitory computer readable medium of claim 1, wherein the request is received in response to a batch reapply.

9. The non-transitory computer readable medium of claim 1, wherein the request is received in response to a user generated request to remove the inferred problem association.

10. A computer-implemented method of a dynamic constraint solver for solving a constraint satisfaction problem that comprises a plurality of nodes and a plurality of constraints, the method comprising:
    receiving a request to remove an inferred problem association;
    determining one or more user decisions that triggered the inferred problem association, wherein each of the one or more user decisions is an action performed by a user during an interactive session with the dynamic constraint solver; and
    removing the one or more user decisions during the interactive session;
    wherein the inferred problem association associates a first problem with a second problem;
    wherein the request to remove is in response to a conflict; and
    wherein the removal of the one or more user decisions prevents the inferred problem association from being regenerated during the interactive session.

11. The computer-implemented method of claim 10, further comprising:
    generating a user interface that identifies the one or more user decisions to a user.

12. The method of claim 10, wherein the constraint satisfaction problem is a product configuration and the first problem and the second problem are product configuration components.

13. The method of claim 10, wherein the request is received in response to a batch reapply.

14. The method of claim 10, wherein the request is received in response to a user generated request to remove the inferred problem association.

15. A dynamic constraint solver system comprising:
    a processor;
    a memory coupled to the processor, the memory storing a constraint satisfaction problem that comprises a plurality of nodes and a plurality of constraints;
    the memory further storing instructions that when executed by the processor, cause the processor to:
    receive a request to remove an auto-contained decision; and
    determine at least one user decision that triggered the auto-contained decision, wherein the user decision is an action performed by a user during an interactive session with the dynamic constraint solver;
    removing the user decision during the interactive session;
    wherein the auto-contained decision associates a first problem with a second problem;

wherein the request to remove is in response to a conflict; and wherein the removal of the user decision prevents the auto-contained association from being regenerated during the interactive session.

16. The system of claim 15, further comprising:
generate a user interface that identifies the user decision to a user.

17. The system of claim 15, wherein the constraint satisfaction problem is a product configuration and the first problem and the second problem are product configuration components.

18. The system of claim 15, wherein the request is received in response to a batch reapply.

19. The system of claim 15, wherein the request is received in response to a user generated request to remove the auto-contained decision.

* * * * *

UNITED STATES PATENT AND TRADEMARK OFFICE
CERTIFICATE OF CORRECTION

PATENT NO. : 8,447,716 B2  
APPLICATION NO. : 12/509546  
DATED : May 21, 2013  
INVENTOR(S) : Bagley et al.

Page 1 of 1

It is certified that error appears in the above-identified patent and that said Letters Patent is hereby corrected as shown below:

On Title page 2, in column 2, under "Other Publications", line 2, delete "IJCAL;" and insert -- IJCAI; --, therefor.

In the Specification:

In column 9, line 10, delete "and or" and insert -- and/or --, therefor.

Signed and Sealed this
Tenth Day of September, 2013

Teresa Stanek Rea
*Acting Director of the United States Patent and Trademark Office*